No. 764,206. PATENTED JULY 5, 1904.
G. H. REYNOLDS.
SPOOL.
APPLICATION FILED FEB. 1, 1904.
NO MODEL. 2 SHEETS—SHEET 1.

Witnesses
R. H. Newman
G. H. Mitchell

Inventor
Geo. H. Reynolds
by R. C. Mitchell
Attorney

No. 764,206. PATENTED JULY 5, 1904.
G. H. REYNOLDS.
SPOOL.
APPLICATION FILED FEB. 1, 1904.
NO MODEL. 2 SHEETS—SHEET 2.

Witnesses
R. H. Newman
G. H. Mitchell

Inventor
Geo. H. Reynolds
by R. C. Mitchell
Attorney

No. 764,206. Patented July 5, 1904.

UNITED STATES PATENT OFFICE.

GEORGE H. REYNOLDS, OF MANSFIELD, CONNECTICUT.

SPOOL.

SPECIFICATION forming part of Letters Patent No. 764,206, dated July 5, 1904.

Application filed February 1, 1904. Serial No. 191,522. (No model.)

*To all whom it may concern:*

Be it known that I, GEORGE H. REYNOLDS, a citizen of the United States, residing at Mansfield, in the county of Tolland, State of Connecticut, have invented certain new and useful Improvements in Spools, of which the following is a full, clear, and exact description.

My invention relates to spools.

The object of my invention is to provide in a simple, economical, and effective manner for the manufacture of spools from finely-divided material, the finished articles possessing great strength and lightness.

Figure 1:
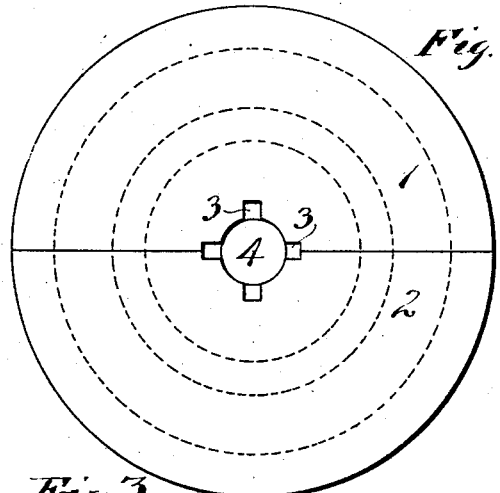
Figure 2:
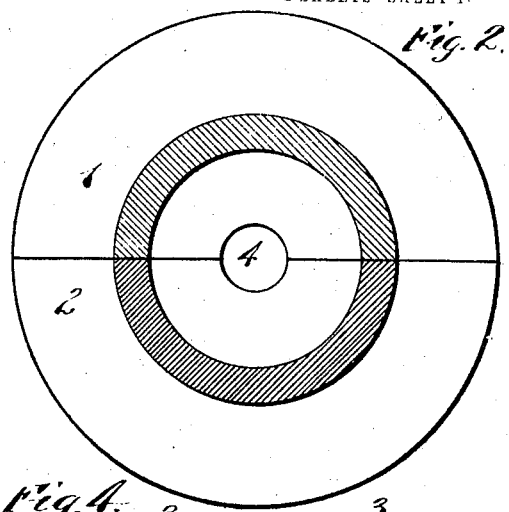
Figure 3:
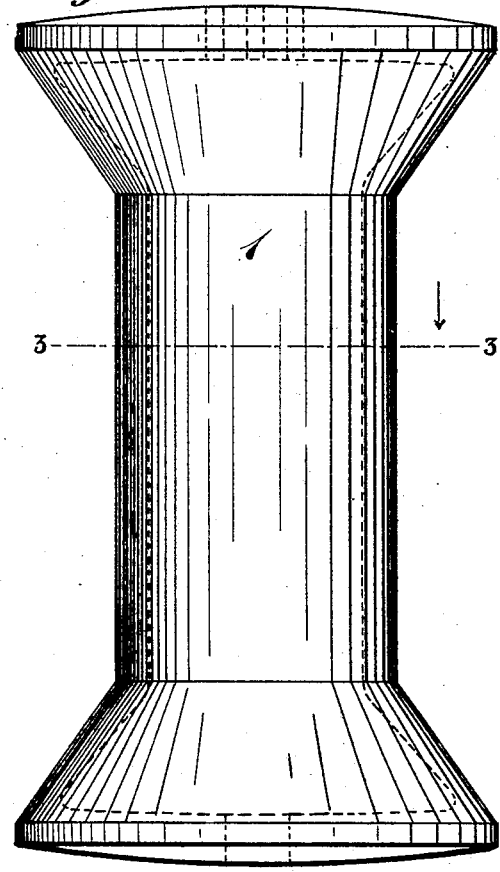
Figure 4:
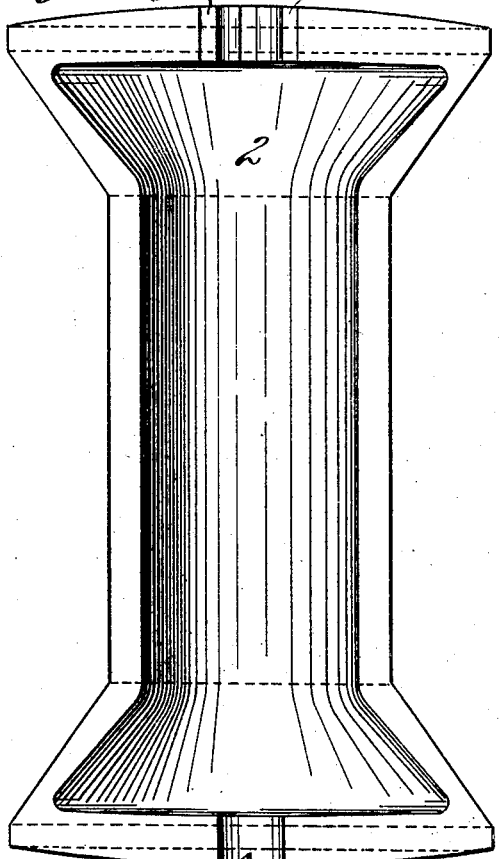
Figure 5:
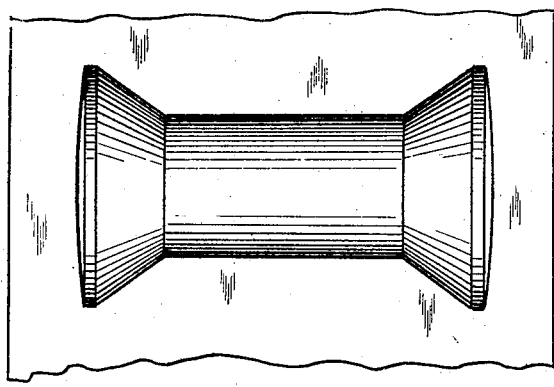
Figure 6:
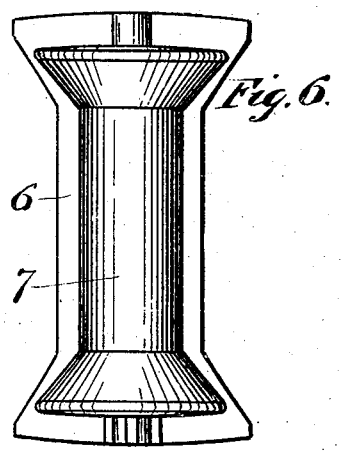
Figure 7:
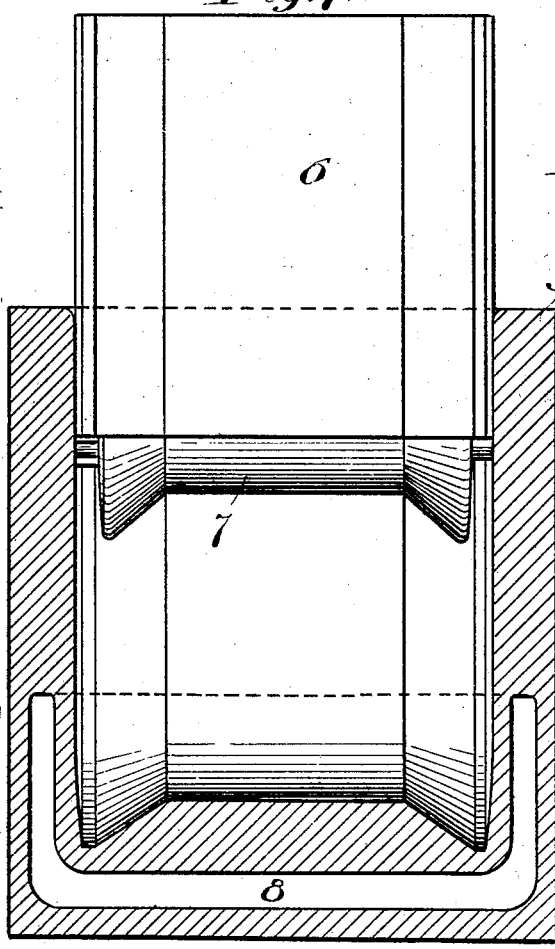
Figure 8:
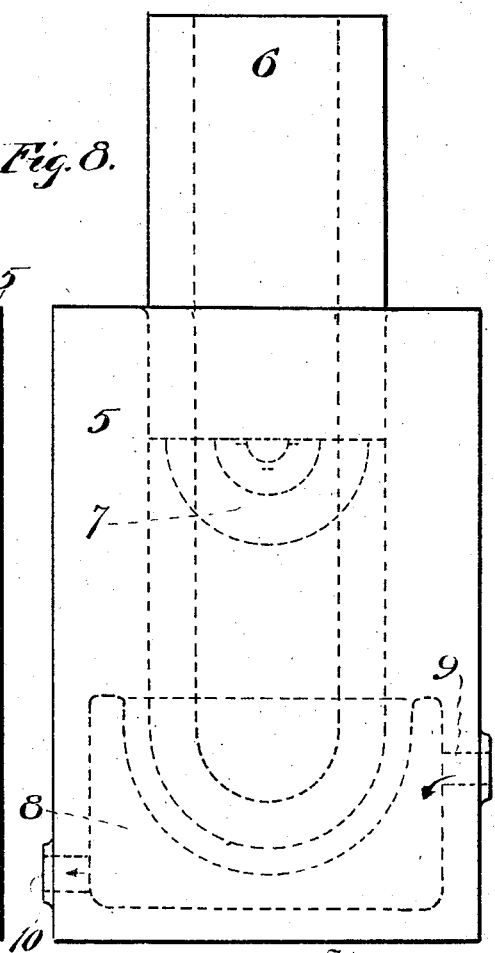

In the drawings, Figure 1 is an end elevation of a spool constructed to embody my invention. Fig. 2 is a plan view thereof. Fig. 3 is a section on the line 3 3, Fig. 2, looking in the direction of the arrow. Fig. 4 is a plan view of the lower section of the spool shown in Fig. 2. Fig. 5 is a plan view of the bed-plate of the die for producing my spool. Fig. 6 is a plan view of the plunger carrying the core-shaper. Fig. 7 is a side elevation of the plunger and a section of the frame of the press utilized in making my improved spool. Fig. 8 is an end elevation of the assembled parts.

The spool comprises a plurality of longitudinal sections, preferably two, and shown at 1 and 2. These sections each represent one-half of a spool divided longitudinally in line with its axis.

3 3 are pockets formed in one or both ends of the spool and laterally of the central bore 4 and provided for the usual spool-spindle and by means of which the spools may be held or rotated when in use. Obviously these pockets 3 3 may or may not be provided. The sections 1 2 are formed separately in a mold or press. These sections 1 2 are secured together, as shown in the end views, Figs. 1 and 2, by cement or otherwise, the line of contact shown in said figures being of course comparatively, if not entirely, inconspicuous in the finished article.

In the drawings, Figs. 5 to 8, I have shown conventionally a press for forming the spool-sections 1 2. 5 is the frame of the press, in which a suitable recess is formed, corresponding in outline to the external shape of one half of the spool and constituting the mold. 6 is the plunger for forcing the material into the mold. 7 is a core-former carried by the plunger 6. By means of this core-former 7 each spool-section 1 and 2 may be hollowed out, so that when the spool is finally completed and the two sections fastened together it will contain no unnecessary material. 8 is a jacketed space within and around the mold in the frame 5. 9 is an inlet. 10 is an outlet from the jacketed space 8.

In the preferred method of manufacture of the spool-sections a dry finely-divided material, a dry pulp containing a fusible binding-size, is introduced into the cavity in the frame, whereupon the plunger 6 is moved downward, compressing said material and coring or hollowing out the spool-section to any desired extent. While under pressure heat may be applied by means of steam introduced into jacketed space 8 and the temperature of the compressed material thus raised until the binding size becomes fused, so as to permeate the entire mass. If desired, water may then be let into the jacketed space 8 to quickly cool the material. I have found by this process and apparatus that the fibers or grain of the material (assuming the material employed is of a fibrous nature) will be disposed longitudinally of the spool, thereby imparting the greatest strength thereto and making it proof against strains which would tend to break off the heads or ends thereof—as, for example, those occasioned when the spool is wound with thread or the like. Another decided advantage of this method of manufacture of spools resides in the fact that the interior of the spool may be cored out, so as to save material and weight.

What I claim is—

1. As an article of manufacture, a spool formed of finely-divided material, comprising a plurality of longitudinal sections secured together lengthwise of the spool.

2. As an article of manufacture, a spool formed of finely-divided material, comprising a plurality of longitudinal sections secured together lengthwise of the spool, said spool having a central longitudinal passage.

3. As an article of manufacture, a spool formed of finely-divided material, comprising, a plurality of longitudinal sections secured together lengthwise of the spool, said spool having a central longitudinal passage, said passage being enlarged intermediate its ends.

4. As an article of manufacture, a spool formed of finely-divided material, comprising two similar longitudinal sections secured together lengthwise of the spool.

GEORGE H. REYNOLDS.

Witnesses:
R. C. MITCHELL,
L. VREELAND.